United States Patent
Van Ee

(10) Patent No.: US 11,964,883 B2
(45) Date of Patent: Apr. 23, 2024

(54) GIGACUBES SOLAR STILL

(71) Applicant: Jonathan Hendrik Van Ee, Dublin, CA (US)

(72) Inventor: Jonathan Hendrik Van Ee, Dublin, CA (US)

( * ) Notice: Subject to any disclaimer, the term of this patent is extended or adjusted under 35 U.S.C. 154(b) by 0 days.

(21) Appl. No.: 17/305,452

(22) Filed: Jul. 7, 2021

(65) Prior Publication Data
US 2022/0041468 A1 Feb. 10, 2022

Related U.S. Application Data

(60) Provisional application No. 62/706,233, filed on Aug. 6, 2020.

(51) Int. Cl.
| | |
|---|---|
| *C02F 1/14* | (2023.01) |
| *B01D 1/00* | (2006.01) |
| *B01D 5/00* | (2006.01) |
| *C02F 1/18* | (2023.01) |
| *E03B 3/28* | (2006.01) |
| *E04B 1/343* | (2006.01) |

(52) U.S. Cl.
CPC .............. *C02F 1/14* (2013.01); *B01D 1/0005* (2013.01); *B01D 5/006* (2013.01); *C02F 1/18* (2013.01); *E03B 3/28* (2013.01); *E04B 1/34331* (2013.01)

(58) Field of Classification Search
CPC ...................... C02F 1/14; B01D 1/0035; E04B 1/34315–34331
See application file for complete search history.

(56) References Cited

U.S. PATENT DOCUMENTS

| | | | | |
|---|---|---|---|---|
| 2,405,877 | A * | 8/1946 | Delano | C02F 1/14 |
| | | | | 203/DIG. 1 |
| 2,902,028 | A * | 9/1959 | Manly | F24S 23/30 |
| | | | | 203/DIG. 1 |
| 3,357,898 | A * | 12/1967 | Novakovich | F24S 20/70 |
| | | | | 202/83 |

(Continued)

FOREIGN PATENT DOCUMENTS

| | | | | |
|---|---|---|---|---|
| CN | 1868902 A | * 11/2006 | ............ | Y02A 20/124 |
| EP | 2656890 A1 | * 10/2013 | ............ | A63H 33/108 |

(Continued)

OTHER PUBLICATIONS

PE2E translation of KR 101625950 B1.*
PE2E translation of EP-2656890-A1.*
PE2E translation of CN-1868902-A.*

*Primary Examiner* — Jonathan Luke Pilcher

(57) ABSTRACT

A solar still that collects and focuses sunlight to convert to steam filthy water and condense the steam in a versatile multipurpose cube casing; the solar still's cube casing is also a building block to build horizontal or vertical structures while simultaneously purifying water; the Gigacubes solar still also builds floating structures, all while cleaning itself with the sun's heat, storing the clean water, heating air or water, and seamlessly interfacing with additional blocks; it performs these tasks while purifying water, providing flotation to a community, and cleaning itself; the Gigacubes solar still also grows plants and entire gardens with soil to provide a low maintenance source of local organic fresh produce in areas that would not otherwise be hospitable to plants on account of being devoid of clean or fresh water.

1 Claim, 7 Drawing Sheets

(56) References Cited

U.S. PATENT DOCUMENTS

| | | | | |
|---|---|---|---|---|
| 3,566,531 A * | 3/1971 | Hasel et al. | | A63H 33/065 |
| | | | | 446/120 |
| 3,747,261 A * | 7/1973 | Salem | | B23Q 1/545 |
| | | | | 446/124 |
| 4,010,080 A * | 3/1977 | Tsay | | F24S 23/30 |
| | | | | 202/83 |
| 4,075,063 A * | 2/1978 | Tsay | | B01D 5/0066 |
| | | | | 203/DIG. 1 |
| 4,151,046 A * | 4/1979 | Eidelberg | | F24S 20/70 |
| | | | | 202/180 |
| 4,183,378 A * | 1/1980 | Decker | | B64B 1/06 |
| | | | | 52/173.3 |
| 4,187,151 A * | 2/1980 | Hanning | | C02F 1/10 |
| | | | | 202/234 |
| 4,210,121 A * | 7/1980 | Stark | | F24S 23/31 |
| | | | | 136/246 |
| 4,267,021 A * | 5/1981 | Speros | | C02F 1/14 |
| | | | | 203/DIG. 1 |
| 4,329,205 A * | 5/1982 | Tsumura | | C02F 1/14 |
| | | | | 203/DIG. 1 |
| 4,406,749 A * | 9/1983 | Wetzel | | C02F 1/14 |
| | | | | 203/DIG. 1 |
| 4,420,375 A * | 12/1983 | Husson | | C02F 1/14 |
| | | | | 203/DIG. 1 |
| 4,766,712 A * | 8/1988 | Hale | | E04B 1/1903 |
| | | | | 52/645 |
| 5,628,879 A * | 5/1997 | Woodruff | | C02F 1/14 |
| | | | | 203/DIG. 1 |
| 5,928,052 A * | 7/1999 | Buscher | | A63H 33/10 |
| | | | | 446/124 |
| 6,050,873 A * | 4/2000 | Reisman | | A63H 33/062 |
| | | | | 446/128 |
| D466,956 S * | 12/2002 | Manville | | D21/499 |
| D468,779 S * | 1/2003 | Manville | | D21/499 |
| D469,825 S * | 2/2003 | Manville | | D21/499 |
| 9,089,096 B1 * | 7/2015 | Ulrich | | E04B 2/08 |
| 9,090,486 B2 * | 7/2015 | Dyson | | F24S 20/69 |
| 9,649,573 B2 * | 5/2017 | Phamdo | | A63H 33/102 |
| 9,849,398 B2 * | 12/2017 | Saigo | | A63H 33/086 |
| 10,329,167 B2 * | 6/2019 | Calene | | B01D 5/0075 |
| 10,954,684 B2 * | 3/2021 | Rüdlinger | | E04B 1/3483 |
| D937,937 S * | 12/2021 | Nevgi | | A63H 33/062 |
| | | | | D21/499 |
| 11,278,821 B2 * | 3/2022 | Brain | | A63H 33/062 |
| 11,345,612 B2 * | 5/2022 | Petrisca | | C02F 1/14 |
| 11,559,154 B2 * | 1/2023 | Hendrik Van Ee | | |
| | | | | B65D 21/0209 |
| 11,565,192 B2 * | 1/2023 | Van Ee | | A63F 9/1208 |
| 11,613,886 B2 * | 3/2023 | Van Ee | | F16S 5/00 |
| | | | | 52/79.1 |
| 2004/0060808 A1 * | 4/2004 | LaViolette | | F24S 10/25 |
| | | | | 203/1 |
| 2009/0308810 A1 * | 12/2009 | de Koning | | B01D 1/22 |
| | | | | 210/640 |
| 2012/0032393 A1 * | 2/2012 | Leicht | | A63H 33/107 |
| | | | | 273/156 |
| 2012/0234771 A1 * | 9/2012 | Dyson | | F24S 20/69 |
| | | | | 210/153 |
| 2017/0113948 A1 * | 4/2017 | Veerappan | | B01D 5/0072 |
| 2017/0350150 A1 * | 12/2017 | Rüdlinger | | E04H 5/02 |
| 2022/0009794 A1 * | 1/2022 | Petrisca | | B01D 1/16 |
| 2022/0039572 A1 * | 2/2022 | Van Ee | | B65D 81/365 |
| 2022/0040565 A1 * | 2/2022 | Van Ee | | A63F 9/12 |
| 2022/0040590 A1 * | 2/2022 | Van Ee | | A63F 3/00697 |
| 2022/0041331 A1 * | 2/2022 | Van Ee | | B65D 21/0213 |
| 2022/0042298 A1 * | 2/2022 | Van Ee | | E04B 1/34331 |
| 2022/0042299 A1 * | 2/2022 | Van Ee | | E04B 1/34331 |
| 2022/0042300 A1 * | 2/2022 | Van Ee | | E04B 1/34331 |
| 2022/0042307 A1 * | 2/2022 | Van Ee | | E04B 2/00 |
| 2022/0042308 A1 * | 2/2022 | Van Ee | | A47B 5/02 |

FOREIGN PATENT DOCUMENTS

| | | | | |
|---|---|---|---|---|
| KR | 101625950 B1 * | 5/2016 | | C01B 3/06 |
| WO | WO-2019168781 A1 * | 9/2019 | | C10G 2/30 |

* cited by examiner

Fig. 1
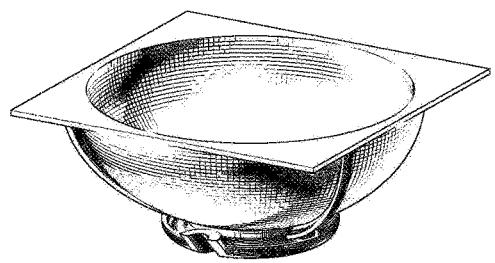
Fig. 2A
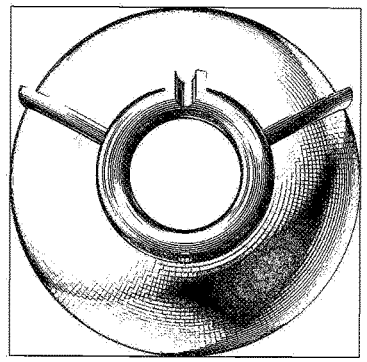
Fig. 2B
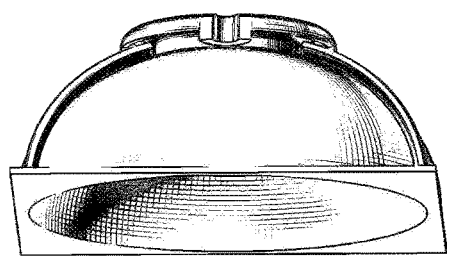
Fig. 2C
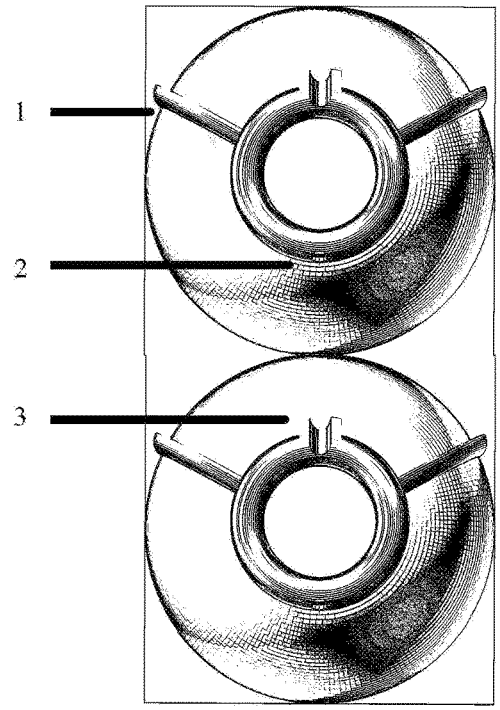
Fig. 2D
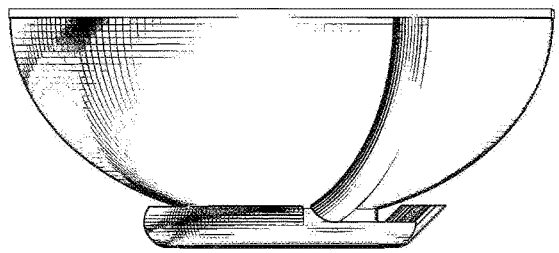
Fig. 2E
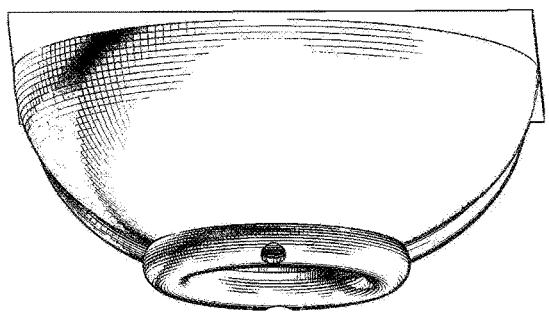
Fig. 2F

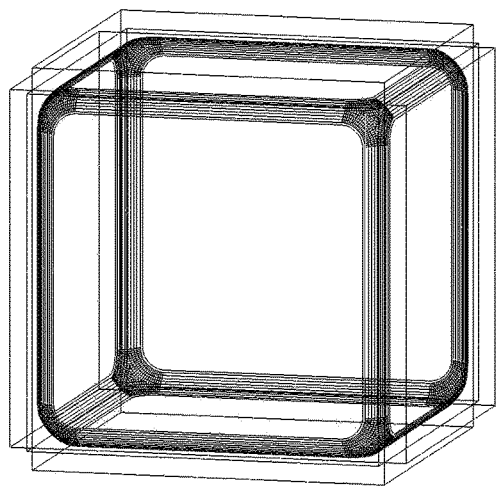
Fig. 6A
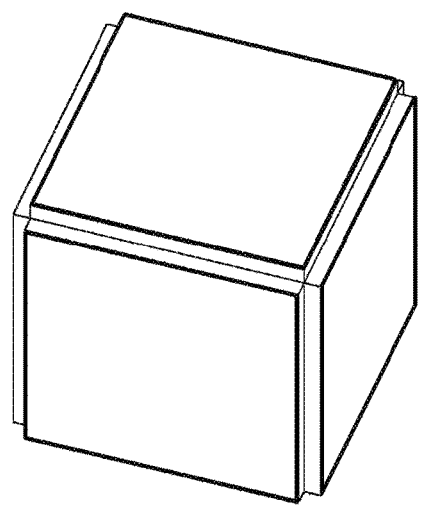
Fig. 6B
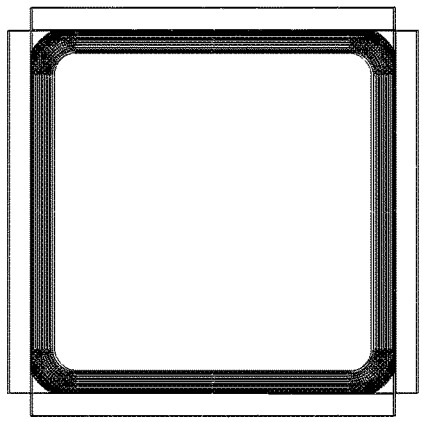
Fig. 6C
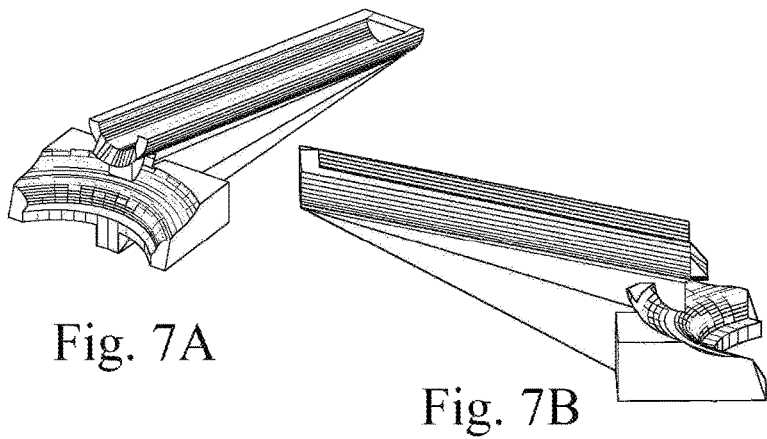
Fig. 7A
Fig. 7B

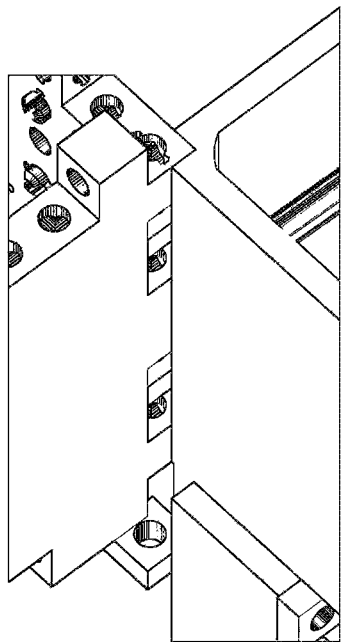 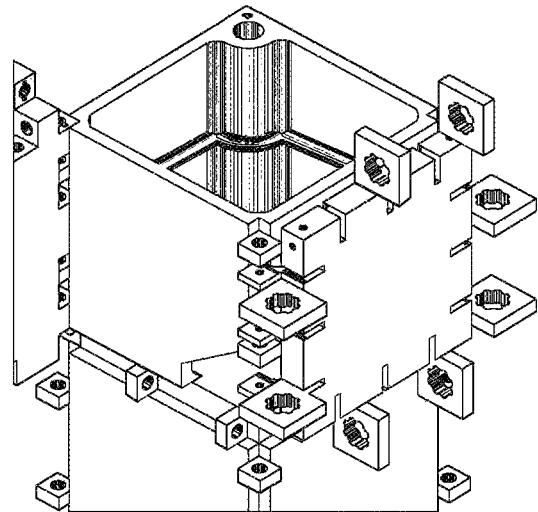
Fig. 14  Fig. 15
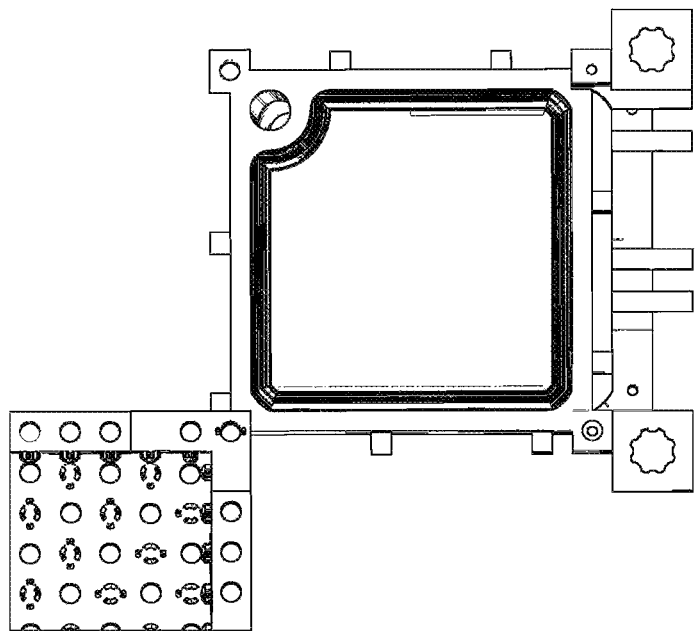
Fig. 16

GIGACUBES SOLAR STILL

BACKGROUND OF THE INVENTION

Field of the Invention

Passive water purification system without moving parts in a floating building block that focuses the sun's rays to generate steam that condenses and drips into a holding tank of purified water, while also providing a building foundation for human communities.

Description of Related Art

Inflatable transparent plastic solar stills have been placed in the water on a temporary emergency basis to provide people stranded at sea with fresh water.

Large floating pontoons have helped human communities build floating cities on bodies of water.

BRIEF SUMMARY OF THE INVENTION

The Gigacubes Solar Still (the "Invention") can be assembled into a floating platform that also purifies water by focusing the sun's rays to heat a hydrophobic metal element submerged in filthy water to generate steam that condenses on the sides of the Invention and trickles down into gutters that take the purified water to a holding tank.

The Invention accomplishes its tasks passively without moving parts by focusing the sun's rays on a hydrophobic metal surface throughout the day at different angles with a Fresnel lens.

While the Invention does not have to be cleaned mostly because the hydrophobic metal resists the accumulation of residue left behind by evaporated water, the Invention cleans whatever impurities that do accumulate by heating itself up during peak sunlight hours.

The Invention purifies water on land, while floating on water, on its own independently of other Invention units, or when connected to other Invention units.

The Invention can purify water while stacked horizontally with other Invention units to form a walkway, pontoon or similar floor surface, or it can also purify water when stacked vertically to form a wall or the side of a house or building that catches sun rays better in northern latitudes.

The Invention is also a building block that can be used to build walkways or buildings while performing solar still tasks or while not performing such tasks.

The Invention can also be a heater that heats water or that heats buildings.

BRIEF DESCRIPTION OF THE SEVERAL VIEWS OF THE DRAWINGS

FIG. 1 is a Fresnel lens that goes on the top of the Invention to focus sunlight and to provide a sturdy level surface for the top of the Invention where people can walk over or that provides the side of a wall when the Invention is assembled vertically.

FIG. 2A is the parabolic bowl that holds the hydrophobic metal element in the middle and that gives space in which the Fresnel lens can focus sunlight on that metal element.

FIG. 2B is a profile view from the bottom of FIG. 2A.

FIG. 2C is a view from a top side of FIG. 2A.

FIG. 2D is a profile view from the bottom of two objects that are FIG. 2A.

FIG. 2E is a profile view from the side of FIG. 2A.

FIG. 2F is a view from a bottom side of FIG. 2A.

FIG. 6A is a wireframe view of FIG. 6B.

FIG. 6B is an example of a single hollow box that floats. The Invention is made by taking two of these boxes, one fused on top of the other, and adapted to become the casing of the Invention shown in FIG. 5A.

FIG. 6C is a wireframe profile view of FIG. 6B.

FIG. 7A is a gutter that snaps on to the casing in the right upper middle part of FIG. 5B so pure water falling from the hole at element 2 in FIG. 2D runs to the edge of the casing and down the tube at the top right side of FIG. 5B.

FIG. 7B is another view of FIG. 7A.

FIG. 13A shows the specific locations of square pieces at an angel.

FIG. 13B shows the specific locations of square pieces in a profile view.

FIG. 14 is a close-up view of how the Invention interfaces with reversible boxes or cubes.

FIG. 15 shows how a panel can be affixed to the side of the Invention following the same logic as the boxes in FIGS. 12 and 14.

FIG. 16 is a profile view from the top of how the box and the panel shown in FIGS. 14 and 15 align with the holes of the hollow squares on the edges of the Invention.

DETAILED DESCRIPTION OF THE INVENTION

Figure 9:
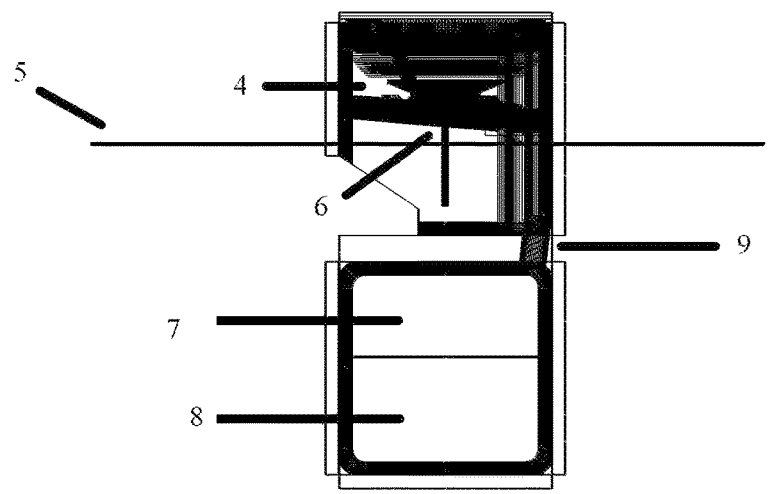
FIG. 9 is another view of the Invention with the pieces assembled except is also shows the Invention submerged in polluted or salt water, the water level of which is labeled as element 5.
Figure 10D:
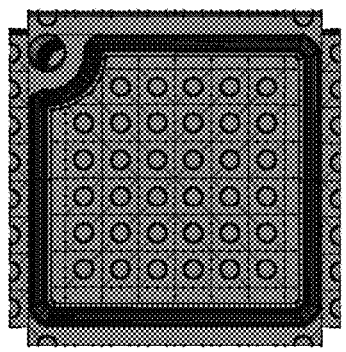
FIG. 10D is a top profile view of one half of FIG. 10C.
Figure 10A:
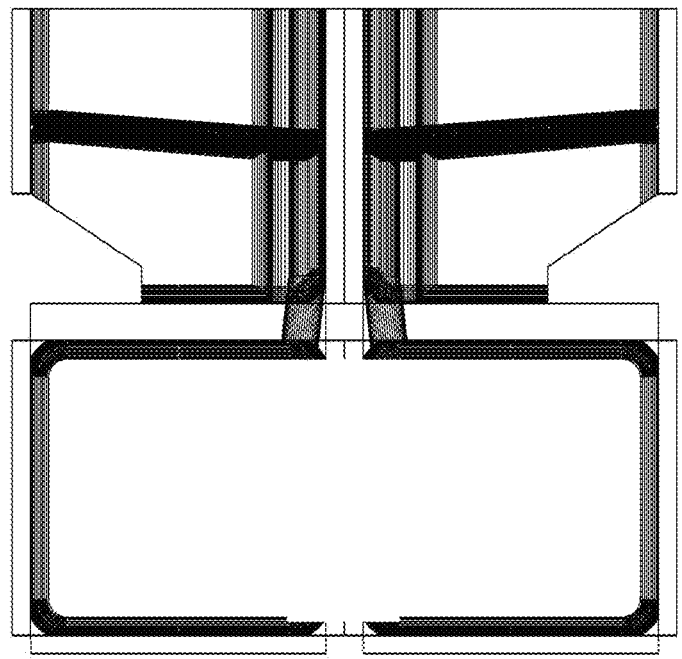
FIG. 10A is a wireframe view of FIG. 10C.
Figure 10B:
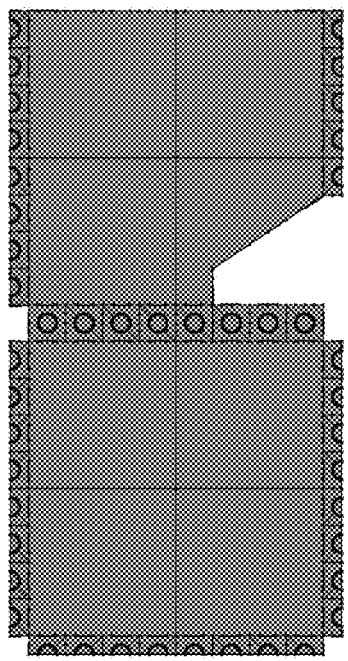
FIG. 10B is a side profile view of FIG. 10C.
Figure 10C:
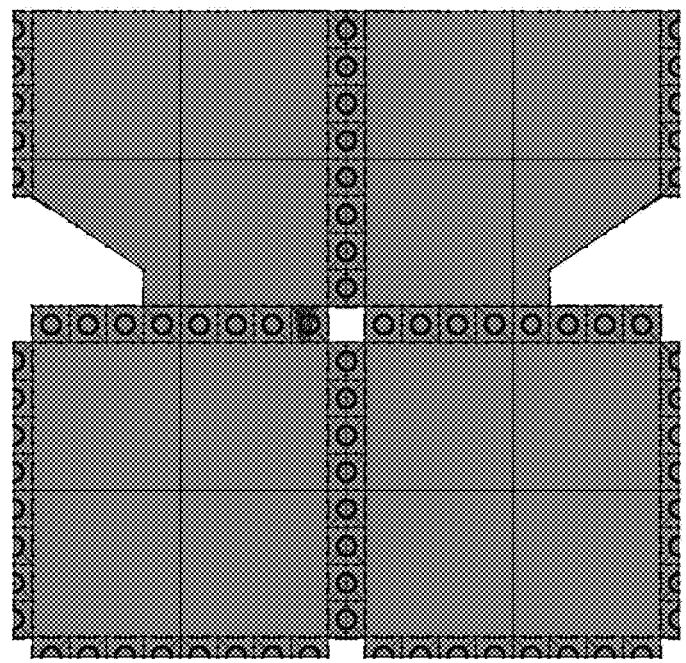
FIG. 10C is the Invention built with two solar stills back-to-back for greater stability, strength, and to share a common tank that holds purified water and air that allows the Invention to float when it is placed in water.
Figure 11:
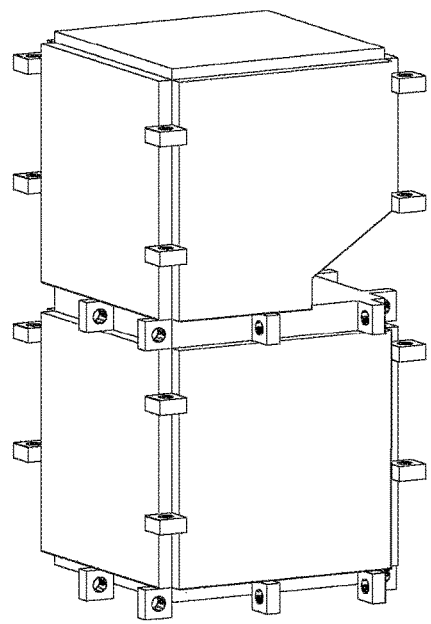
FIG. 11 shows the Invention with hollow square pieces at specific locations on its edges that allow the Invention to fit into itself when stacked horizontally or vertically. Poles are placed through those hollow square pieces to secure the Invention when it is assembled with itself.
Figure 12:
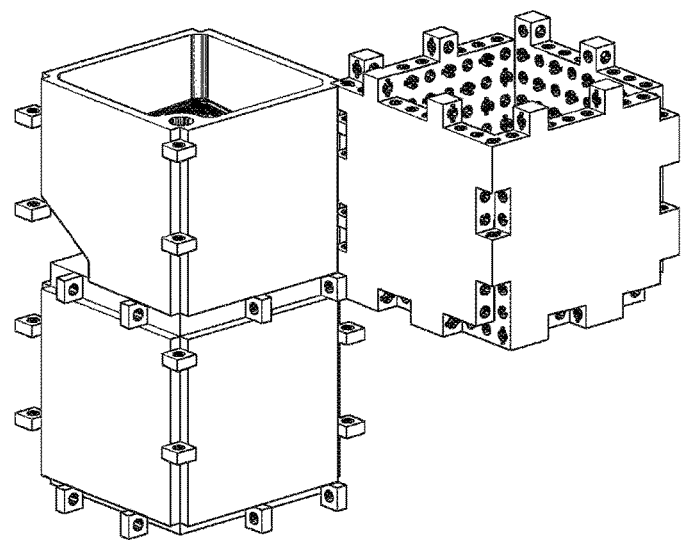
FIG. 12 shows the Invention assembled with boxes that have gaps at specific locations on the edges to allow them to fit into themselves and into the Invention. Again, poles are placed through the hollow edges of the box and the Invention casing to secure them.
Figure 13A:
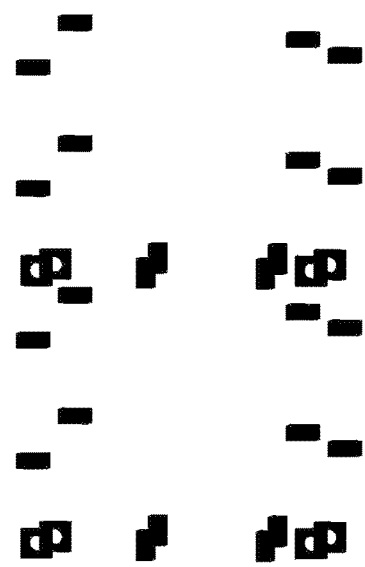
FIGS. 13A-13B show the specific locations of the square pieces with hollow centers that are necessary for the Invention to fit into itself in a reversible manner.
Figure 13B:
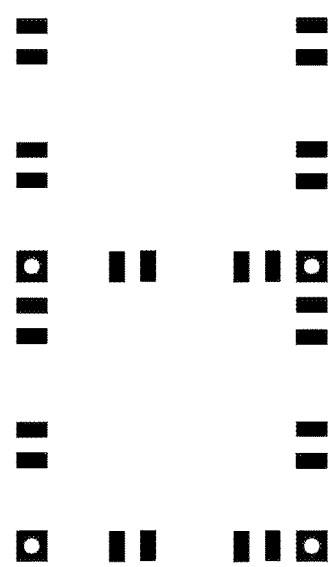

FIG. 9 shows how the assembled Invention, submerged in salty or filthy water, purifies that water with sunlight. The sunlight comes down from the top and hits the top surface of the Invention which is comprised of the Fresnel lens. The Fresnel lens, which is resting on top of the casing and the parabolic bowl, focuses that light on the hydrophobic metal element at the bottom of that bowl. That element in turn transmits the heat from that light down into the filthy water at a point identified as element 6. The level of the filthy water is identified as element 5.

The water touching the hot element turns into steam that rises into the air cavity that is at element 4 and condenses on the underside of the bowl and on the sides of the top part of the top box that forms the casing of the Invention. The water droplets fall into the gutters on the side of the invention's casing and on the bottom of the bowl and flow into the corner of the casing that has the tube going down to the bottom tank of the Invention. The water flows through the tube that is identified as element 9 in FIG. 9.

The clean water collects in the tank at the bottom of the Invention in an area represented by element No. 8. The more the tank filled the less buoyancy it will have. The level of buoyancy of the Invention can be increased by pumping clean water out of the holding tank and up through the pipe that is element 9. That pipe goes straight to the top of the casing. If the tank is too empty the buoyancy may be too great, creating an unstable flotation dynamic (depending on the general flotation dynamics that the Invention is a part of). The Invention will have some buoyancy even with a full holding tank because the area at element 4 is filled with air. However, having some buoyancy in the tank when the Invention is floating will allow the Invention to bob up and down without sinking. In other words, the water level at element No. 5 can go up or down below its location in FIG. 9 without compromising the flotation of the Invention and without compromising the effectiveness of the solar still purification process.

The parabolic bowl in FIG. 2 can be made of plastic, metal or ceramic. Its material should be opaque to not allow sunlight into the bottom of the Invention because that will cause moss, algae and other living organisms to develop as pests or nuisances in the Invention and require more cleaning. The view of FIG. 2A is of the bowl in the horizontal position. When water vapor rises from below in the Invention it collects on the bottom side of the bowl and drips down, ultimately collecting in the circular gutter at the bottom of the bowl as shown in FIG. 2A.

FIG. 2B is the same bowl in a vertical orientation in which the vapor goes up and then condenses on the top of the bowl to run down the gutters on the bowl that have a "y" configuration. FIG. 2C shows the gutters from the top. In FIG. 2D one of these gutters is identified as element No. 1. If rising steam condenses on the bottom of the bowl while it is in the vertical orientation of FIG. 2D, then that water will ultimately drip down into these "y" gutters in the bowl below the top bowl when they are stacked in the manner shown in FIG. 2D.

When water collects in the gutters it runs down through a hole that is identified as element no. 2. From there is flows down to a chute that is element no. 3. That chute pushes the water away from the bowl so that it will cascade down and be collected at the bottom of the vertical stacked array in which multiple boxes with the Invention comprise a wall.

FIG. 2E is a profile view that shows how the gutters collect and move the water.

FIG. 2F shows how the hole (which is also element 2 in FIG. 2D) drains purified water from the gutters when the Invention is in either a vertical position (as in FIG. 2D) or a horizontal position (as in FIG. 2F).

Figures 3A, 3B, 4:
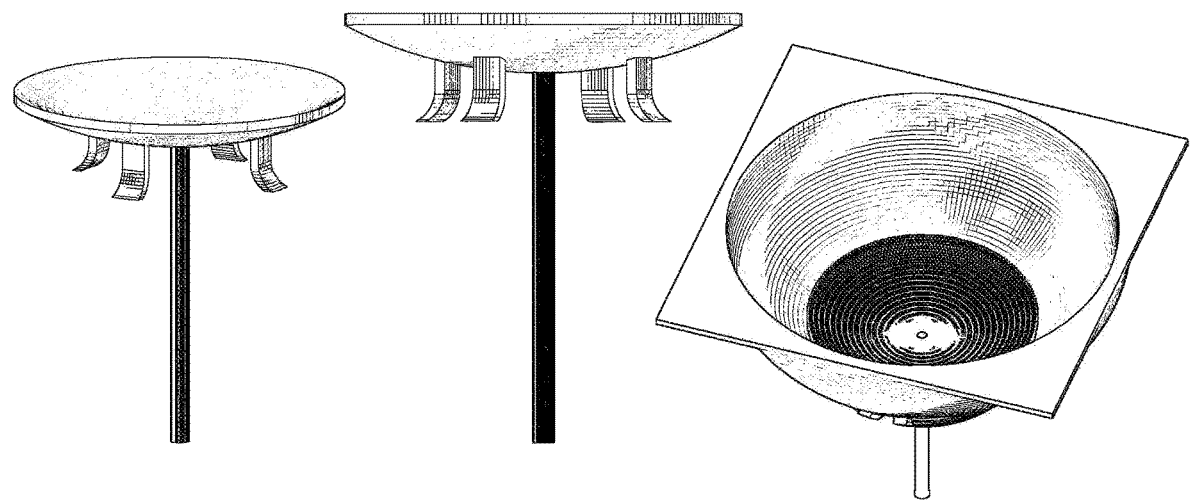
FIG. 3A is a profile view from the side of FIG. 3A.
FIG. 3B is the hydrophobic metal element that snaps into the parabolic bowl and whose heated tip dips into polluted water to transmit heat that turns the water into steam.
FIG. 4 shows how the hydrophobic metal element inserts into the parabolic bowl and snaps in place.
Figures 5A, 5B:
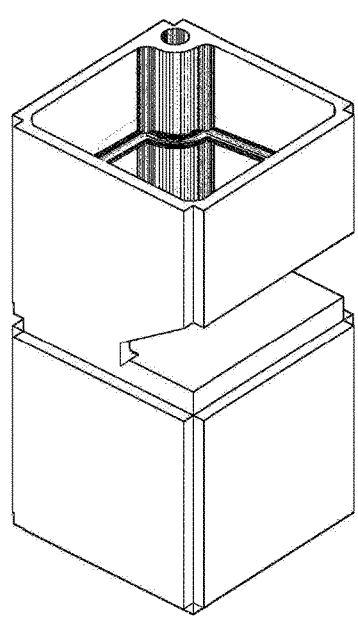
FIG. 5A is the box casing of the Invention that secures the parabolic bowl and Fresnel lens at the top, whose bottom box allows for flotation when air is kept in it, and whose top side is open so that polluted or salt water can flow in to be heated by the metal element.
FIG. 5B is a wireframe view of FIG. 5A from a different angle.
Figure 8A:
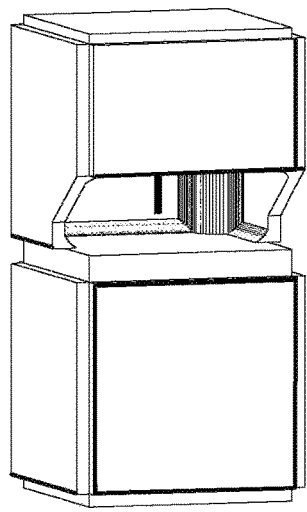
FIG. 8A is the Invention with all other FIGS. assembled so that the Fresnel lens is at the top covering the parabolic bowl, the metal element in that bowl pushes down into the opening where the polluted or saltwater flows, and the gutters carry the condensed water to the pipe that leads to the box below.
Figure 8B:
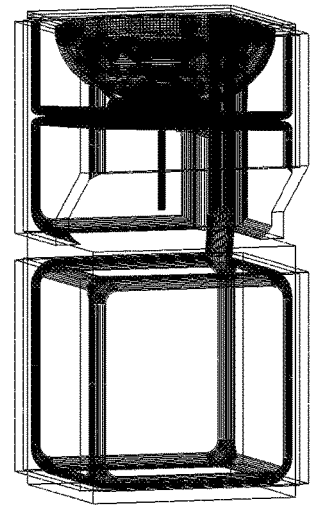
FIG. 8B is a wireframe view of FIG. 8A.

FIGS. 3A and 3B are slightly different views of the hydrophobic metal element that goes in the parabolic bowl. Its top rounded area catches the sunlight focused by the Fresnel lens during different times of day. The focal points of the sun's rays changes as the position of the sun changes throughout the day and the metal element catches that focal point during the times of greatest sunlight. The element then transmits the sun's heat down into the salty or polluted water in the Invention, causing it to evaporate in the form of steam that rises up into the higher part of the Invention that includes the bottom side of the bowl and the top part of the Invention's top box.

The Invention can rest on the ground inside impure water and does not have to be floating to work.

The Invention can be assembled horizontally and vertically into a building and does not have to regularly function as a solar still. In fact, it can be used on an as-needed basis in a dry location away from any water source. When pure water is needed, the user can purify filthy water by putting a bucket under the metal element and filling the bucket with filthy water. The element will then heat that filthy water, turn it into steam, and thereby purify it when the Invention collects it as condensed water.

The Invention seamlessly interfaces with buildings and objects built with the Gigacubes system because the Invention follows the conventions of that system. For example, the holes in the center of the squares on the edges of the Invention are exactly half the size of the squares. The Invention's casing is square when viewed from the top and is exactly twice as tall as it is wide when viewed from the side. These dimensions, which are ratios that are not necessarily connected to any specific distance, make the Invention an easy addition to, or part of, a Gigacubes structure or device. For example, a Gigacubes house or an entire community with several houses and buildings can be built on the Invention.

Gardens can be planted on top of the Invention with plants at its corners having roots extending down through the pipe at element No. 9 in FIG. 9 and into the fresh water holding tank below.

The double tanks in FIG. 10 can have the Fresnel lens and heating metal element taken off one side with dirt placed in the bowl instead. A garden can be planted in that dirt with roots that extend down into the tank that holds fresh water below. This way the Invention can purify water on one side and support a garden on the other side. In the right conditions with the right kind of water, sufficient heat and the right plants with long enough roots, the process can be almost entirely self-sustaining with little or no maintenance. Robust plants like cactus that can handle variations in water and that also do well in sunny environments, do particularly well when planted in this manner. They are also edible and require virtually no care. The Invention can thereby create a local, organic, almost entirely labor-free source of healthy food for a community in filthy or salty water that would not otherwise be able to exist.

The invention claimed is:

1. A set of physical objects comprising:

cube shapes that are twice as tall as they are wide;

wherein the cube shapes have a lower half comprising an enclosed cavity filled with air that allows them to float in water;

wherein the cube shapes submerge in water so that a majority of each cube shape is below a water surface;

wherein water enters into each of the cube shapes in a respective middle portion thereof such that the water comes in contact with a heated rod disposed within each cube shape;

wherein the heated rod causes the water to become steam and rise into a top enclosed compartment of the cube shape where the steam condenses on a side of the top enclosed compartment;

wherein the water that condenses on the side of the top enclosed compartment collects into gutters along the side of the compartment and flows down into an enclosed cavity in a lower half of the cube where condensed water is stored;

wherein the heated rod is heated by sunlight focused by a Fresnel lens onto a metal plate to which the heated rod is affixed;

wherein the cube shapes are solar stills and are functional as building blocks, such that the cube shapes can be assembled to build structures configured to perform water purification in a particular environment;

wherein the cube shapes are made of hard objects, soft objects, flexible objects and/or magnetic objects;

wherein the cube shapes interface with each other at interfaces;

wherein the interfaces include sticks, nails, knobs, hooks, gears, snaps, screws, latches, magnets, kawai tsugite, bearings and/or hinges arranged along corners of the cube shapes;

wherein the cube shapes bear mathematical relationships towards each other, wherein the cube shapes are configured to be joined together at the interfaces and locked together and reinforced with poles or sphere shapes having mathematically defined dimensions.

* * * * *